US007359892B2

(12) United States Patent
Jokinen et al.

(10) Patent No.: US 7,359,892 B2
(45) Date of Patent: Apr. 15, 2008

(54) METHOD AND APPARATUS PROVIDING DATABASE INQUIRY SERVICES BY DYNAMICALLY CREATING INTELLIGENT LINKS FOR REFINING A SEARCH

(75) Inventors: Vesa-Matti Jokinen, Espoo (FI); Juha Tammela, Masala (FI)

(73) Assignee: Nokia Corporation, Espoo (FI)

( * ) Notice: Subject to any disclaimer, the term of this patent is extended or adjusted under 35 U.S.C. 154(b) by 453 days.

(21) Appl. No.: 10/495,977

(22) PCT Filed: Dec. 4, 2002

(86) PCT No.: PCT/FI02/00988

§ 371 (c)(1),
(2), (4) Date: May 19, 2004

(87) PCT Pub. No.: WO03/048971

PCT Pub. Date: Jun. 12, 2003

(65) Prior Publication Data

US 2005/0021675 A1 Jan. 27, 2005

(30) Foreign Application Priority Data

Dec. 7, 2001 (FI) .................................. 20012416

(51) Int. Cl.
*G06F 7/00* (2006.01)
*G06F 15/16* (2006.01)

(52) U.S. Cl. .............................. 707/3; 707/5; 709/203; 709/217

(58) Field of Classification Search ...................... None
See application file for complete search history.

(56) References Cited

U.S. PATENT DOCUMENTS 6,173,284 B1    1/2001  Brown
6,675,159 B1 *  1/2004  Lin et al. ......................... 707/3
6,868,525 B1 *  3/2005  Szabo ........................ 715/738
6,988,095 B1 *  1/2006  Dorfman ......................... 707/3
2002/0073079 A1 *  6/2002  Terheggen ..................... 707/3
2002/0133488 A1 *  9/2002  Bellis et al. .................... 707/6
2003/0061214 A1 *  3/2003  Alpha ............................ 707/7
2005/0278321 A1 * 12/2005  Vailaya et al. ................. 707/3

FOREIGN PATENT DOCUMENTS

| GB | 2 359 712 A   | 8/2001  |
|----|---------------|---------|
| WO | WO 01/50715 A2 | 7/2001 |
| WO | WO 01/80133 A2 | 10/2001 |
| WO | WO 02/13050 A2 | 2/2002 |
| WO | WO 02/13488 A1 | 2/2002 |
| WO | WO 02/15084 A1 | 2/2002 |

* cited by examiner

*Primary Examiner*—Wen-Tai Lin
(74) *Attorney, Agent, or Firm*—Squire, Sanders & Dempsey, L.L.P.

(57) ABSTRACT

A connection is established between a micro browser of a wireless user communication device and an inquiry application on a network server. Browser views are transferred from the inquiry application to the micro browser and displayed to the user by the micro browser. At the beginning of the inquiry, the user can input initial inquiry data, typically text, to an input field in an insert view and activate the inquiry. In response to an inquiry request thus formed, the inquiry application carries out proactive inquiries to one or more databases on the basis of the initial inquiry data input by the user. Then the inquiry application creates a browser view where the results of these proactive inquiries are presented as one or more intelligent link to an actual inquiry, e.g. to one or more databases.

16 Claims, 5 Drawing Sheets

METHOD AND APPARATUS PROVIDING DATABASE INQUIRY SERVICES BY DYNAMICALLY CREATING INTELLIGENT LINKS FOR REFINING A SEARCH

BACKGROUND OF THE INVENTION

The present invention relates to computer database searches or inquiries, and more precisely, database inquiries carried out with a user device of a wireless communications network.

In a typical database search, a user queries the database by selecting a set of criteria (a request) and submitting those criteria to a database engine. Many different methods have been utilized to facilitate the user's creation of database requests. In some user interfaces, a user answers a series of questions, fills out an on-line form, or selects from a finite number of choices. Once such a search request is submitted, the database engine returns the search results meeting the criteria, if any, and the user interface displays the results. A method that is very often used to display the data returned from the database query, is the hierarchical map or tree structure, which enables the user to navigate from the route of the tree through one or more sub-categories (branches) in order to find the desired information. Typical example of the categorized tree structure are yellow pages offered as electronic database services. This type of directory contains information about businesses categorized by headings. The categories are defined by type of product or service sold by the various businesses. Finally, under the business name some basic information, such as an address and a phone number, are displayed.

Most of these services are offered in the Internet and they are best suited for fixed workstations which are connected to a wired telecommunications network, use sufficiently high-speed transmission connections and have enough processing capacity and a large graphic display. However, when the user is using a wireless portable communication device, such as a mobile phone or a communicator, problems are encountered. One of the problems is the typically low transmission rate (for example 9,6 kbit/s) of the radio channel over the air interface. This problem is nowadays alleviated by high-speed data services offered by the modern digital mobile networks. The more serious problem is the user device itself. The typical requirements of a wireless end-device, such as a mobile phone, include a very small size, light weight, low power consumption and low price. These requirements result in the use of less effective microprocessors, less memory capacity, smaller display and lower display resolution, and a limited keyboard in comparison with the standard personal computers. Therefore, dedicated data communication and inquiry techniques have been developed for the wireless environment.

WO 98/11744 discloses the implementation of a data inquiry service in a digital mobile communications network using a short message service. Typically, the inquiries are made to servers in the Internet. For this purpose, a short message center (SC) is connected to the Internet and employs the HTML (HyperText Markup Language), HTTP (HyperText Transfer Protocol) and TCP/IP (Transmission Control Protocol/Internet Protocol) protocols towards the Internet. Short messages are sent in a conventional manner between the short message center and the mobile station. The user sends a short message including an identifier indicating the desired web page to the short message center. The short message center establishes a connection to a desired WWW (World Wide Web) server through the Internet, receives the web page from the Internet and stores said page. The relevant part is distinguished from the web page and is sent to the mobile station in a short message. This relevant part of the web page can be identified using a predetermined criterion, which is common to all subscribers, or it may be based on a criterion received from the mobile station, such as a keyword. The mobile station processes the received short message in a conventional manner and displays it to the user. This approach provides the advantage that the mobile station only needs to support the short message service in order to utilize inquiry services, or Internet services. Such an inquiry service based on the short message service is commonly referred to as smart messaging. Different operators and service providers have applied smart messaging. For example, when a short message is sent to a number 400 in the Sonera GSM mobile communications network, and the short message contains a predetermined search word, then a reply including information associated with the search word is obtained. The smart messaging services typically also comprise a menu structure, in which a desired topic can be selected from a predetermined menu or a corresponding web site can be searched for using search words. The menus can each be packed into a single short message, and the list of headlines can be divided into blocks.

Also browsing web pages by means of mobile stations is difficult, particularly owing to the limitations of the mobile stations display. On this account, a specific technology has been developed for mobile stations, referred to as a WAP (Wireless Application Protocol), in which WML pages (Wireless Mark-up Language) are transferred to the mobile stations. The properties of the WML pages are better suited to the small displays in mobile stations and to the transmission capacity of the mobile network. The Internet may comprise web pages directly presented in the WAPNVML format, or conventional WWW/HTML pages can be converted into the WAPNVML format in a particular gateway unit (WAP gateway). The gateway apparatus is typically located at the interface between the mobile communications network and the Internet. The user sends a request concerning a particular web page to the WAP gateway using a micro browser in the mobile station, and the WAP gateway retrieves the web page from the Internet and converts it to a WML page, which is thereafter loaded to the micro browser. The micro browser shows the WML page on the mobile station display. Also in WAP applications hierarchical tree structures or selection menus are employed for allowing the user to navigate to the desired information.

DISCLOSURE OF THE INVENTION

An object of the present invention is to provide an improved database inquiry method for a user communication device of a wireless communications network so that the navigation needed for searching relevant information is reduced.

This object is achieved by means of a method, a server, a computer program product and a computer program according to the independent claims 1, 5, 9, and 10, respectively. The preferred embodiments of the invention are disclosed in the dependent claims.

According to the present invention a connection is established between a micro browser of a wireless user communication device and an inquiry application on a network server. Browser views are transferred from the inquiry application to the micro browser and displayed to the user by the micro browser. At the beginning of the inquiry, the user can input initial inquiry data, typically text, to an input field in an insert view and activate the inquiry from the keyboard of the communication device. In response to an inquiry request thus formed, the inquiry application carries out proactive inquiries to one or more databases on the basis of the initial inquiry data input by the user. Then the inquiry application creates a browser view, where the results of these proactive inquiries are presented as one or more intelligent links to an actual inquiry, e.g. to one or more databases. In other words, from the presentation (name) of the intelligent link the end-user obtains general information about the results that can be expected from the inquiry, if the respective intelligent link is activated. Thus, the inquiry application analyses the results of the proactive inquiry so as to create for the intelligent link the presentation that as such provides relevant information to the enduser. On the basis of information presented in the intelligent links, the enduser can make a decision on whether he/she should make a further inquiry by activating the intelligent link for obtaining more detailed information. Also the content of the further inquiry can be presented in a browser view having intelligent links according to the present invention. As a consequence, the enduser may activate none or any number of the intelligent links in order to obtain the desired information without having to navigate through all the links in order to check whether there is critical information behind the link or not. This is a significant benefit incomparison with the prior art methods wherein navigation through a hierarchical menu or tree structure defining the content of the database is required.

The present invention is particularly advantageous when the inquired information is searched for from two or more separate databases and the combined result is presented to an enduser. The names of the intelligent links can then be used for indicating what kind of inquiry results can be expected from each particular database when the respective link is activated.

BRIEF DESCRIPTION OF THE DRAWINGS

The invention will be described by means of the preferred embodiments and referring to the accompanying drawings, in which.

THE PREFERRED EMBODIMENTS OF THE INVENTION

Figure 1:
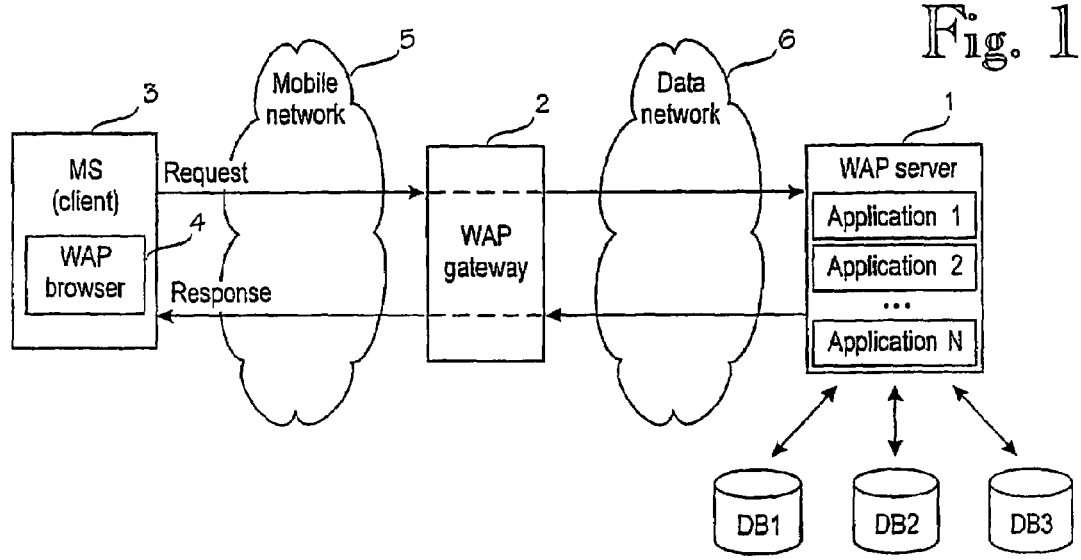
FIG. 1 is a block diagram illustrating the architecture of the system wherein the present invention can be applied.

Referring to FIG. 1, a user communication device 3 of the wireless network 5 is provided with a micro browser supporting an appropriate transmission protocol for communication with a server 1 on the network side. In the preferred embodiments of the invention the mobile network is a digital mobile network, such as TETRA, GSM, or UMTS, and the wireless device 3 is a mobile terminal or mobile station MS for such a digital mobile communications network. However, the invention is not restricted to any specific digital mobile communications system or user communication device but is universally applicable. In the preferred embodiment of the invention the transmission protocol employed is WAP and the micro browser 4 is a WAP browser, but the invention is not intended to be restricted to any specific transmission protocol or micro browser. In the preferred embodiment of the invention, the server 1 communicating with the mobile station MS3 is. a WAP server and comprises a set of inquiry applications 1, 2 . . . n, but the server 1 may support any transmission protocol compatible with the micro browser 4 in the mobile station MS3. Typically a connection between the WAP browser 4 in the mobile station MS and the application in the WAP server 1 is established through the mobile network 5 to a WAP gateway 2 and further via one or more data network 6 to the WAP server 1. The data network 6 may include a local area network (LAN), an Intranet, the Internet, etc. The WAP server 1 is substituted for or embodied in the WAP gateway 2 so that the mobile station MS and the WAP server 1 communicate directly. It should be appreciated that the type of connection and communication between the micro browser 4 in the mobile station 3 and the applications in the server 1 is not relevant to the present invention. Typically, the communication between the browser 4 and the server 1 is based on sending requests from the browser, processing those responses in the server 1, and sending responses from the server 1 to the browser 4. The response contains all the information required for displaying a browser view, (e.g. WAP page/card) to the user on a display of the mobile station MS 3. The WAP protocol and architecture employed in the preferred embodiment of the invention is well-known to persons skilled in the art and defined in the specification of the wireless application protocol forum. These specifications are available from the wireless application protocol forum web site (http://www.wapforum.org). Mobile stations supporting the WAP are commercially available from a number of manufacturers, such as Nokia. Also software products and tool kits for embodying the standard functions of the WAP gateway 2 and the WAP server 1 are available from Nokia.

As noted above, the WAP server 1 comprises a set of inquiry applications for making data inquiries from a set of databases, such as DB1, DB2 and DB3. These applications typically communicate with the databases over data network(s), such as LANs, an Intranet, the Internet, etc. It is also possible that inquiry applications are located in two or more servers similar to the WAP server 1, in which case the connection from the mobile station 3 is made to the appropriate WAP server according to the inquiry application selected by the enduser. In the preferred embodiment of the invention the inquiry applications are personalized applications for different kinds of users, such as policemen and firemen. Typically, these inquiry applications use simultaneously a plurality at databases.

Figure 2:
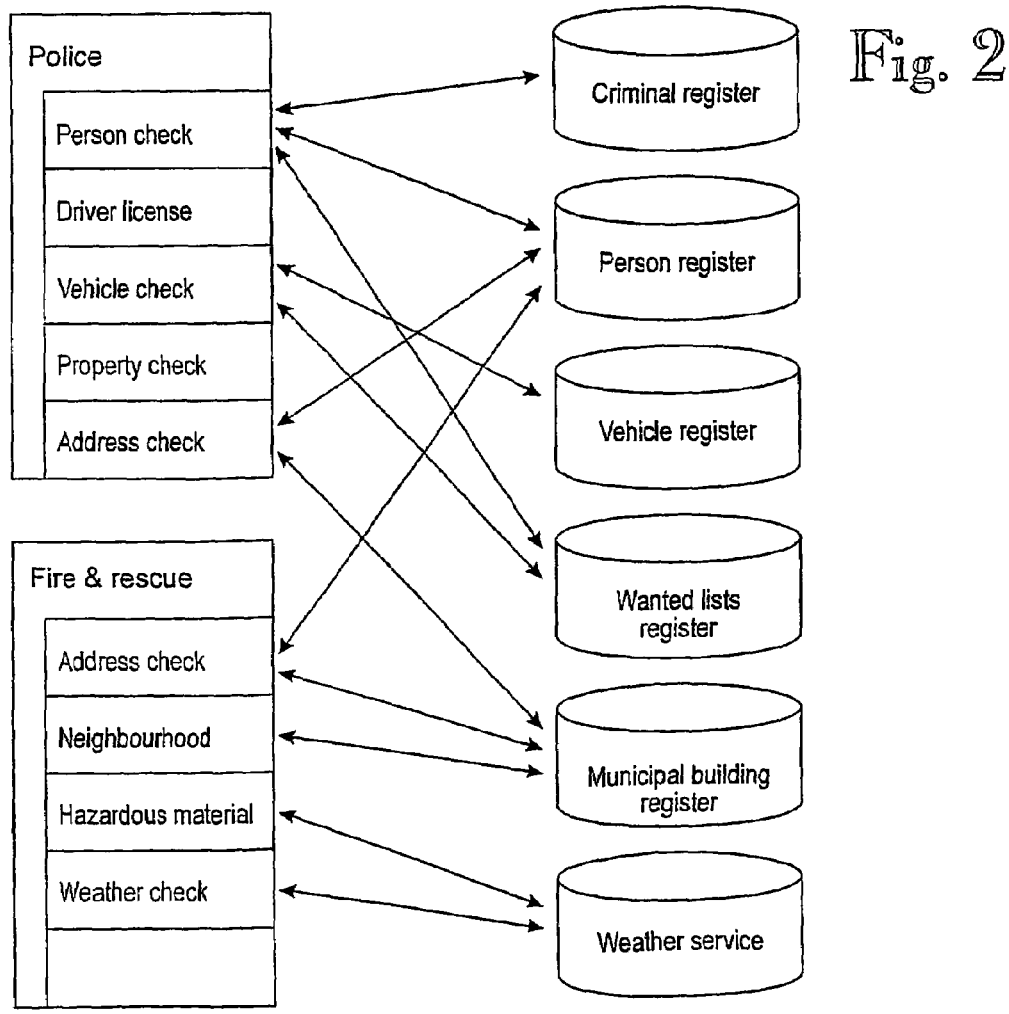
FIG. 2 is a block diagram illustrating different types of inquiry applications for two types of users, and the associations between the inquiry applications and a set of databases.

FIG. 2 illustrates different inquiry applications offered to the police and the fire and rescue personnel. The inquiry applications offered to the police include a person check, a driving licence check, a vehicle check, a property check, and an address check. Similarly, the inquiry applications offered to firemen include an address check, a neighbourhood check, a hazardous material check, and a weather check. All of these inquiry applications use simultaneously two or more of the following databases: a criminal register, a person register, a vehicle register, a wanted list register, a municipal building register, a weather service, etc. By means of these applications the policemen and firemen can easily and automatically obtain critical information relating to their work. The present invention will be now illustrated by means of an example in which the users are policemen and the inquiry applications are the person check and the vehicle check, with reference to FIG. 3, FIGS. 4A-4I, 5A-5D, and 6.

Figure 4A:
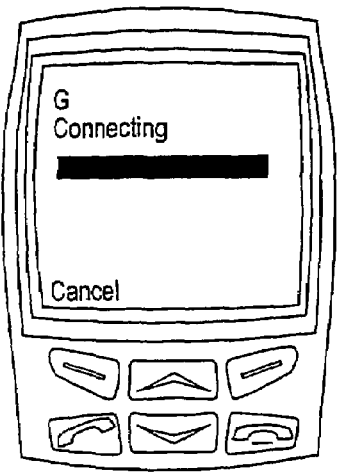
FIGS. 4A-4I illustrate the browser view when proceeding from the establishment of the connection via the insert data view and inquiry results view to the wanted list view in the case of a vehicle check application.
Figure 4B:
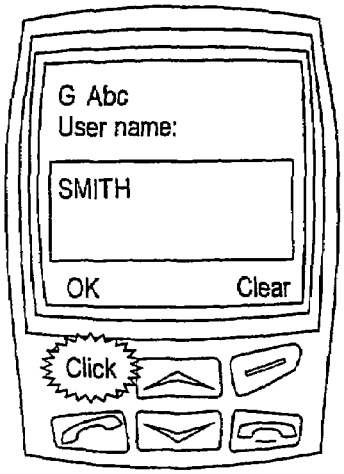
Figure 4C:
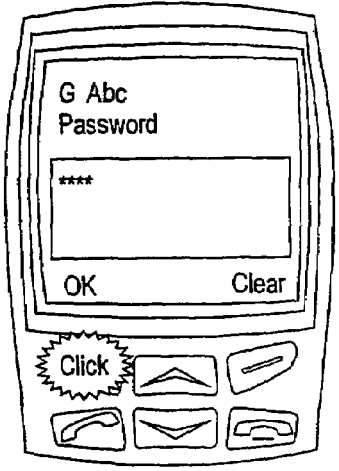
Figure 4D:
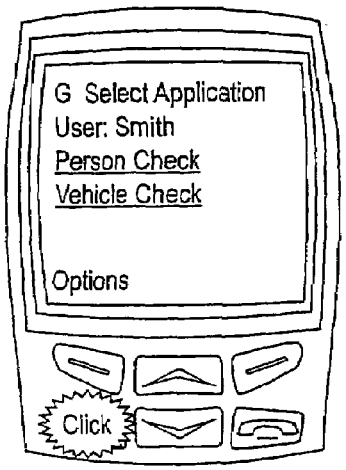
Figure 4E:
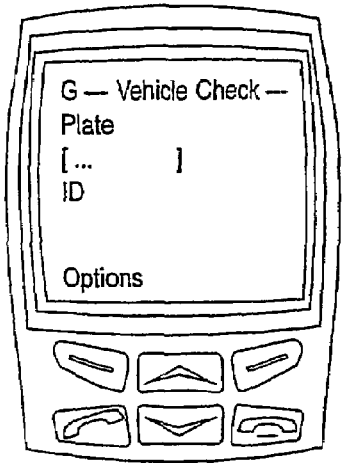
Figure 4F:
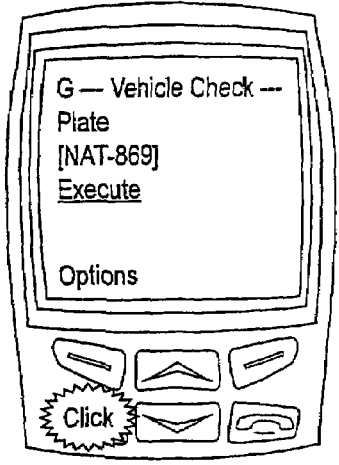

Firstly, referring to FIG. 4A, a policeman using his mobile phone provided with the WAP capability, i.e. a WAP browser, initiates a connection to the WAP server 1 in accordance with the WAP procedures. In a response from the server 1, a browser view prompting the user to enter his user name is returned, as shown in FIG. 4B. The user enters his user name "Smith" from the keyboard of the mobile phone and clicks the left button "OK" which is a shortcut for opening a link to the next browser view. As a result, a request with the input user name is sent to the server 1 that returns the next browser view requiring a password, as shown in FIG. 4C. The user enters the password "XLRS" and opens the link to the next browser view by clicking the left button "OK". The password is sent to the server 1 that checks the access rights under the given user name and password. If the user name and the password are accepted, the server 1 allows the user to access the predetermined inquiry services available to the specific user. In this example they are classified applications for police usage, namely the person check application and the vehicle check application. The server 1 returns to the browser 4 in the mobile phone a "select application" browser view shown in FIG. 4D. The select application browser view contains links "person check" and "vehicle check" to the respective applications. The user can select one of the links by means of the arrow buttons and then open the link by clicking a predetermined button on the keyboard. In this case the user selects and opens the "vehicle check" link. The selection is sent to the server 1, which returns the "vehicle check" view shown in FIG. 4E. In the vehicle check view the user is requested to enter a plate number of the vehicle and/or some other ID. The user enters the plate number "NAT-869" and opens the "execute" link, as shown in FIG. 4F.

Figure 3:
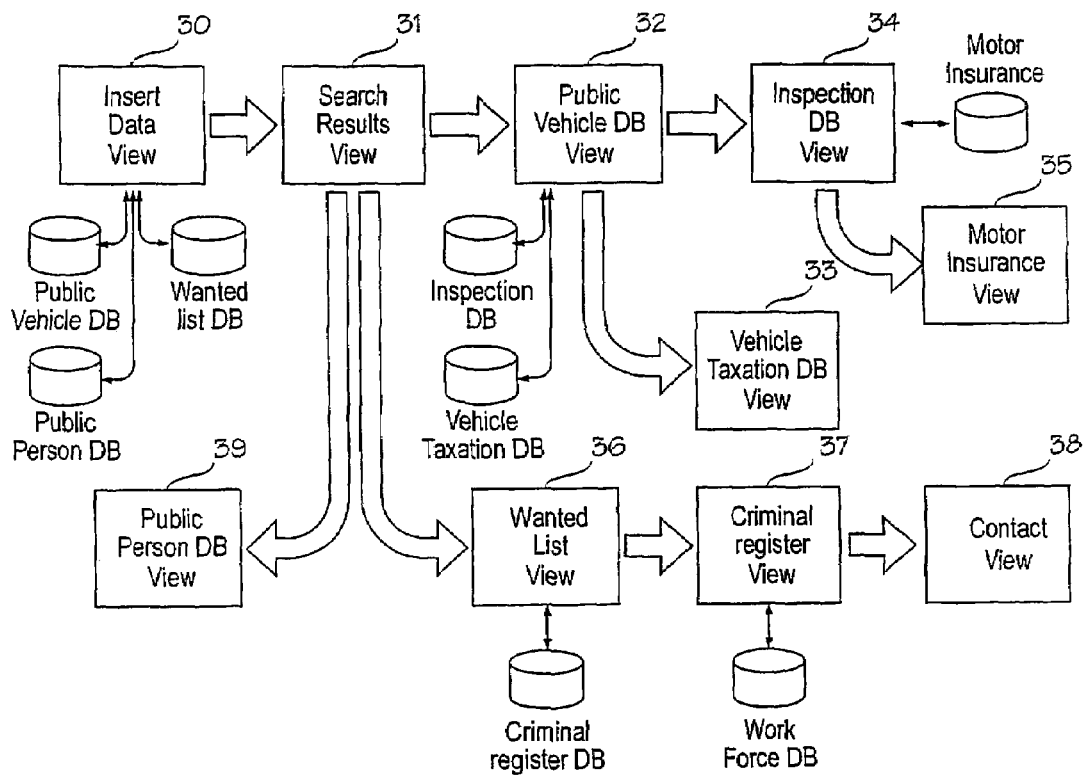
FIG. 3 is a block and flow diagram illustrating the process flow of the vehicle check application from one browser view to another.
Figure 4G:
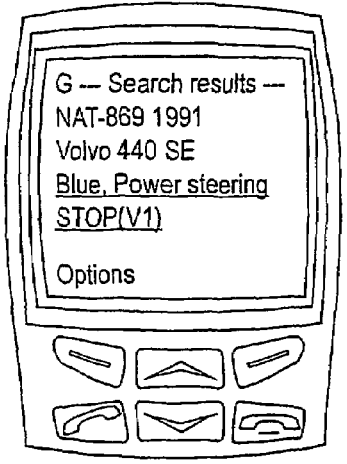
Figure 4H:
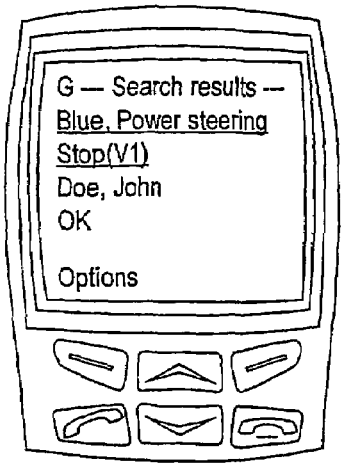
Figure 6:
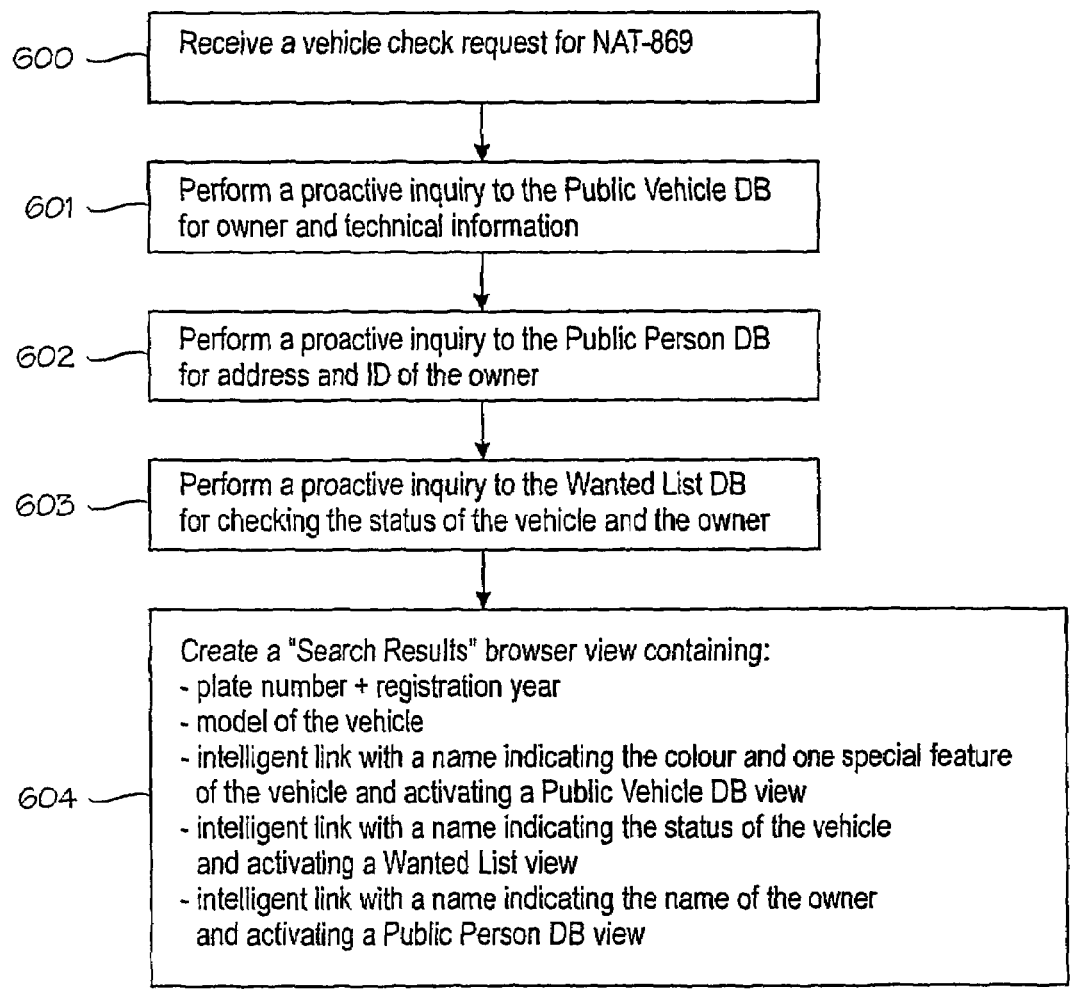
FIG. 6 is a flow diagram illustrating the procedure for performing the proactive inquiries and creating the search results browser view with the intelligent links according to the invention.

The inquiry procedure followed by the vehicle check application is illustrated in FIG. 3. The insert data view 30 corresponds, in this example, to the browser views shown in FIGS. 4E and 4F. When the user opens the "execute" link in FIG. 4F, the entered inquiry data (i.e. the plate number) is sent to the vehicle check application in the server 1. Referring now to FIG. 6, the vehicle check application receives a vehicle check request for the plate number NAT-869 (step 600). In accordance with the basic principles of the present invention, the vehicle check application now performs a set of proactive inquiries to various databases in order to receive information for providing the search results view 31 with intelligent links. Firstly, the vehicle check application performs a proactive inquiry to the public vehicle database for obtaining vehicle related information, such as the name of the owner and technical information on the vehicle (step 601). Secondly, on the basis of the owner information obtained in the first proactive inquiry, the vehicle check application performs a further proactive inquiry to the public person database for obtaining more specific and updated information on the owner, such as the address and the health insurance code (or other ID) of the owner (step 602). Finally, the vehicle check application performs a proactive inquiry to the wanted list(s) database for checking the status of the vehicle and the owner. The wanted list database may contain a list of stolen vehicles or vehicles which are otherwise sought for, as well as persons who are sought for or followed by the police (step 603). On the basis of the results of these proactive inquiries, the check vehicle application creates the "search results" browser view containing some searched information, such as the plate number, registration year and model of the vehicle, as well as some intelligent links according to the present invention (step 604). This dynamically created search results view 31 is then returned to the browser 4. An example of the search result view is shown in FIGS. 4G and 4H. The first line under the title indicates the registration number "NAT-869" and the registration year "1991". On the next line, the model of the vehicle "Volvo 440 SE" is shown. The next line is an intelligent link with the name indicating the colour ("blue") and one special feature ("power steering") of the vehicle. Thus, the name of the link provides information that is obtained by the proactive inquiry to the public vehicle database. It also provides a link to the public vehicle database and thereby enables the user to make a further inquiry in order to obtain more detailed information on the vehicle. Referring to FIG. 3, the opening of this link may cause the vehicle check application, (in addition to making an inquiry to the public vehicle database,) to make proactive inquiries to an inspection database and a vehicle taxation database and to create a public vehicle database view on the basis of the inquiry results. In accordance with the principles of the present invention, the public vehicle database view 32 may further comprise intelligent links to the inspection database or vehicle taxation database. Opening of the former link will cause the vehicle check application to create a vehicle taxation database view 33 and to return it to the browser 4. Opening of the latter link may cause the vehicle check application to make a proactive inquiry to a motor insurance database and to create an inspection database view 34 containing an intelligent link to the motor insurance database. Opening of this link will cause the vehicle check application to create a motor insurance view 35 and to return it to the browser 4.

Figure 4I:
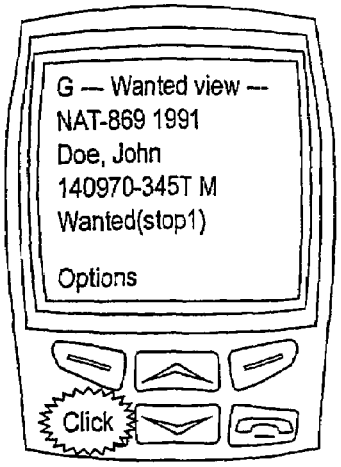

Returning now to FIG. 4G, the next line in the search results view 31 is an intelligent link with the name indicating the status of the vehicle. This link is created on the basis of the inquiry made to the wanted list database. The status shown is "OK" if no results are obtained, i.e. the vehicle is not in the wanted list database. The name "OK" informs the user that the vehicle is not stolen and no further inquiry to the wanted list database is necessary. Actually, in order to prevent unnecessary inquiries, a link with the name "OK" cannot be activated by the user at all. If the vehicle is found in the wanted list database, the name of the vehicle status link is "STOP", which is an operating link to the wanted list database. The name also contains a code that represents the level of the status in the wanted list. If the user activates this intelligent link, the check vehicle application performs a proactive inquiry to the criminal register database and creates a wanted list view 36 on the basis of the results of the inquiry. The wanted list view 36 is returned to the browser 4 and displayed to the user. An example of the wanted list view 36 is shown in FIG. 4I. The first line shows the registration information of the vehicle, second line shows the name of the owner, and the third line shows his/her health insurance code. The fourth line is an intelligent link created on the basis of the proactive inquiry to the criminal register database. The name of the link indicates that the vehicle should be stopped at level 1. If the user wishes more information about the reason to stop, the check vehicle application makes, in addition to an inquiry to the wanted list database, a proactive inquiry to the criminal register DB and creates a criminal register view 37. The criminal register view may include an intelligent link having a name that indicates the name of the detective handling in the case. If the user wishes to have contact information relating to the detective, he activates this link that causes the check vehicle application to make a proactive inquiry to a work force database and to create a contact view 38.

Referring again to FIG. 4G, the user can use the arrow buttons in the mobile phone to browse more lines in the search results view 31. As shown in FIG. 4H, the following line is an intelligent link with the name indicating the name of the owner of the vehicle ("Doe John"). If the user activates this link, the check vehicle application creates and returns to the mobile phone a public person database view 39. The bottom line in FIG. 4H indicates the status of the owner. In this case the status is "OK", which means that the owner is not in the wanted list database. As a consequence, the name "OK" does not function as a link to the wanted list database. However, in a manner (similar) to what was described above with respect to the status of the vehicle, if the owner is in the wanted list database, the status "STOP" is shown on this line, and the line also functions as an intelligent link to the wanted list database. This will be explained in more detail below in connection with the check person application.

Figure 7:
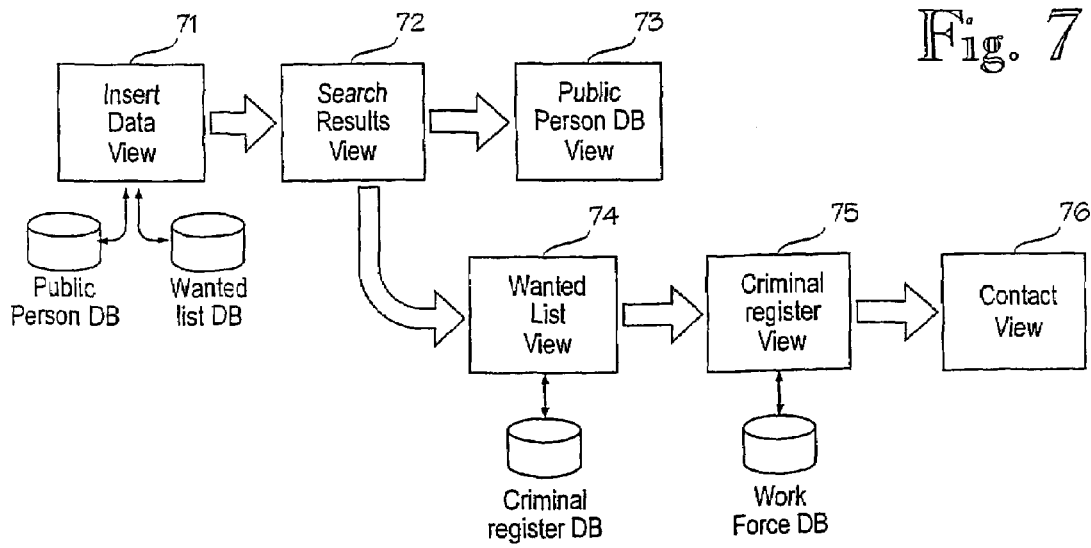
FIG. 7 is a block and flow diagram illustrating the process flow of the person check application from one browser view to another
Figure 5A:
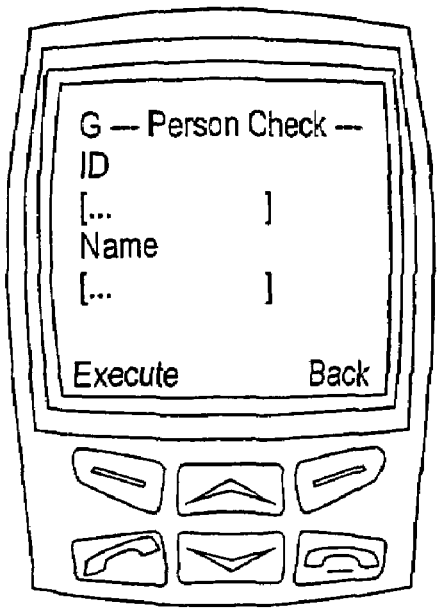
FIGS. 5A-5D illustrate different browser views from the insert data view through the inquiry results view to the wanted view in the case of the person check application.
Figure 5B:
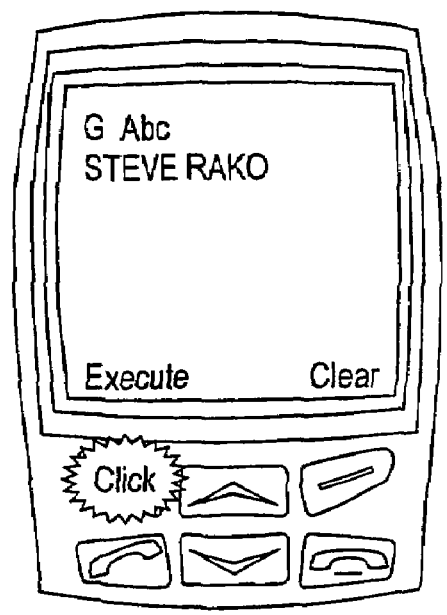
Figure 5C:
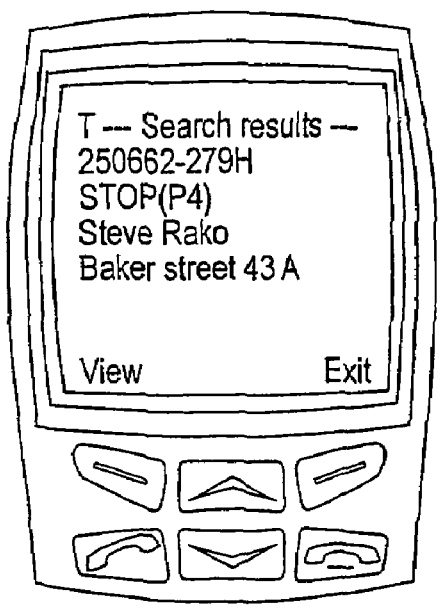

As a second example, the check person application will now be explained. Let us first assume that the user has already locked in to the server 1 in the manner shown in FIGS. 4A-4C and can now see the select application view shown in FIG. 4D. The user can reach this selection menu also by returning from the vehicle check application described above. Let us further assume that the user selects and opens the link to the person check application. A flow diagram of the person check application is shown in FIG. 7. In response to the activation, the check person application returns an insert data view 71 to the mobile phone. An example of this insert data view 71 is illustrated in FIG. 5A. The user can enter the identity, such as a health insurance code and the name of the person to be searched, on the empty lines in FIG. 5A. In FIG. 5B the user has entered the name "Steve Rako" and starts the inquiry procedure with his name by opening the execute link. Referring again to FIG. 7, the person check application performs proactive inquiries to the public person database and the wanted list database and creates a search results view 72 on the basis of the inquiries. An example of the search results view 72 is shown in FIG. 5C. Under the title "search results" the first line indicates the health insurance code of Steve Rako. This also functions as an intelligent link to the public person database. Activation of this link causes the check person application to create and return to the browser 4 a public person database view 73 shown in FIG. 7. The search results view of FIG. 5C also displays the name and address of the search person. The second intelligent link in FIG. 5C is the status of the searched person. As explained above, the content of this link is created on the basis of the proactive inquiry made to the wanted list database. If the person to be checked is not found in the wanted list database, the name of the link is "OK" and it will not activate any further inquiry. However, if the person to be checked is found in the wanted list database, the link has the name "STOP" and provides an intelligent link to the wanted list database. The name "STOP" is also associated with a number code that can have values from 0 to 5, for example. This code describes the seriousness or status of the wanted list. The letter P stands for a person and the letter V stands for a vehicle. The number code may indicate the following statuses, for example: 0=ask questions, possible witness; 1=petty suspect; 2=suspect for crime; 3=wanted criminal; 4=let go, but inform immediately further; and 5=armed and dangerous criminal. Thus, the name of the link gives relevant information on the person to be sought and enables the user to make decisions without necessarily accessing the wanted list database.

Figure 5D:

In response to the activation of the person status link, the person check application makes a proactive inquiry to the criminal register database and creates a wanted list view. An example of the wanted list view is shown in FIG. 5D. The first two lines present the name and health insurance code of the person. The third line indicates more detailed information on why the person should be stopped. This information is obtained from the wanted list database. The bottom line is an intelligent link created on the basis of the proactive inquiry to the criminal register database. The name of the link indicates the serial number of the relevant criminal record (00275), the type of the crime (DRG=drugs), and the date of the entry (13.11.01). Activation of this link will cause the person check application to make a proactive inquiry to the work force database and to create a criminal register view 75. This view may contain an intelligent link with a name that indicates the name of the policeman handling the case. This link is created on the basis of the proactive inquiry to the work force database. If this link is activated, the person check application will make a further inquiry to the work force database and create a contact view containing information on how to contact the detective.

It will be obvious to a person skilled in the art that, as the technology advances, the inventive concept can be implemented in various ways. The invention and its embodiments are not limited to the examples described above but may vary within the scope of the claims.

The invention claimed is:

1. A method of providing database inquiry services for a user communication device of a wireless communication system, the method comprising:
   establishing a connection between a micro browser of said user communication device and an inquiry application on a network server;
   receiving an initial inquiry data input by a user of said user communication device;
   carrying out proactive inquiries to one or more databases in order to find predefined information on the basis of said initial inquiry data;
   dynamically creating names of intelligent links for a next browser view on the basis of the results of said proactive inquiries in such a manner that the name of each intelligent link is suitable for displaying by the micro browser and provides generic information on the status or seriousness of inquiry results that can be expected if the respective intelligent link is activated by the user;
   activating one of said intelligent links in said next browser view by a user;
   carrying out further proactive inquiries to one or more databases in order to find predefined information; and
   dynamically creating names of intelligent links for a subsequent browser view on the basis of the results of said further proactive inquiries so that the name of each intelligent link provides generic information on the status or seriousness of inquiry results that can be expected if the respective intelligent link is activated by the user.

2. The method according to claim 1, further comprising:
carrying out said proactive inquiries to two or more different databases.

3. The method according to claim 1, further comprising:
selecting said inquiry application from among two or more inquiry applications allowed for the user,
each of said two or more inquiry applications having different sets of proactive inquiries.

4. A server for providing database enquiry services for a user communication device of a wireless communications system, the server comprising:
an establishing unit configured to establish a connection with a micro browser in said user communication device;
a first carrying unit configured to carry out proactive inquiries to one or more databases in order to find predefined information on the basis of an initial inquiry data input by a user of said communication device;
a first creating unit configured to create names of intelligent links for a next browser view on a basis of the results of said proactive inquiries in such a manner that the name of each intelligent link is suitable for displaying by the micro browser and provides generic information on the status or seriousness of inquiry results that can be expected if the respective intelligent link is activated by the user;
a second carrying unit configured to carry out further proactive inquiries to one or more databases in order to find predefined information in response to said user activating one of said intelligent links in said next browser view; and
a second creating unit configured to create names of intelligent links for the subsequent browser view on the basis of the results of said further proactive inquiries so that the name of each intelligent link provides generic information on the status or seriousness of inquiry results that can be expected if the respective intelligent link is activated by the user.

5. The server according to claim 4, the server further comprising a second carrying unit configured to carry out said proactive inquiries to two or more different databases.

6. The server according to claim 4, said first carrying unit being implemented by two or more inquiry applications selectable by said user, each of said two or more inquiry applications having different sets of proactive inquiries.

7. A computer program product comprising a computer readable storage medium for controlling a computer to perform
establishing a connection between a micro browser of said user communication device and an inquiry application on a network server;
receiving an initial inquiry data input by a user of said user communication device;
carrying out proactive inquiries to one or more databases in order to find predefined information on the basis of said initial inquiry data;
dynamically creating names of intelligent links for a next browser view on the basis of the results of said proactive inquiries in such a manner that the name of each intelligent link is suitable for displaying by the micro browser and provides generic information on the status or seriousness of inquiry results that can be expected if the respective intelligent link is activated by the user;

activating one of said intelligent links in said next browser view by a user;
carrying out further proactive inquiries to one or more databases in order to find predefined information; and
dynamically creating names of intelligent links for a subsequent browser view on the basis of the results of said further proactive inquiries so that the name of each intelligent link provides generic information on the status or seriousness of inquiry results that can be expected if the respective intelligent link is activated by the user.

8. A server for providing database enquiry services for a user communication device of a wireless communications system, wherein the server is configured to:
establish a connection with a micro browser in said user communication device,
carry out proactive inquiries to one or more databases in order to find predefined information on the basis of an initial inquiry data input by a user of said communication device,
dynamically create names of intelligent links for the next browser view on the basis of the results of said proactive inquiries in such a manner that the name of each intelligent link is suitable for displaying by the micro browser and provides generic information on the status or seriousness of inquiry results that can be expected if the respective intelligent link is activated by the user,
carry out further proactive inquiries to one or more databases in order to find predefined information in response to said user activating one of said intelligent links in said next browser view,
dynamically create names of intelligent links for a subsequent browser view on the basis of the results of said further proactive inquiries so that the name of each intelligent link is suitable for displaying by the micro browser and provides generic information on the status or seriousness of inquiry results that can be expected if the respective intelligent link is activated by the user,
carry out further proactive inquiries to one or more databases in order to find predefined information in response to said user activating one of said intelligent links in said next browser view, and
dynamically create names of intelligent links for a subsequent browser view on the basis of the results of said further proactive inquiries so that the name of each intelligent link is suitable for displaying by the micro browser and provides generic information on the status or seriousness of inquiry results that can be expected if the respective intelligent link is activated by the user.

9. The server according to claim 8, wherein the server is further configured to carry out said proactive inquiries to two or more different databases.

10. The server according to claim 8, wherein the server is configured to carry out proactive inquiries implemented by two or more inquiry applications selectable by said user, each of said two or more inquiry applications having different sets of proactive inquiries.

11. A system, for database inquiry, the system comprising:
browser device to be utilized by a user; and
a network server having an inquiry application,
wherein the browser device is configured to establish connection with the inquiry application on the network server,
wherein the network server is configured to receive an initial inquiry data input from the browser device and to carry out proactive inquiries to one or more databases in order to find predefined information on the basis of the initial inquiry data, wherein the browser device is further configured to dynamically create names of intelligent links for a next browser view on the basis of the results of the proactive inquiries in such a manner that the name of each intelligent link is suitable for displaying by a micro browser and provides generic information on the status or seriousness of inquiry results that can be expected if the respective intelligent link is activated from the browser device, wherein the network server is further configured to carry out further proactive inquiries to one or more databases in order to find a predefined information, wherein the browser device is further configured to dynamically create names of intelligent links for a subsequent browser view on the basis of the result of the further proactive inquiries so that the name of each intelligent link is suitable for displaying by the micro browser and provides generic information on the status or seriousness of inquiry results that can be expected if the respective intelligent link is activated by a user, wherein the network server is further configured to carry out further proactive inquiries to one or more databases in order to find a predefined information, and wherein the browser device is further configured to dynamically create names of intelligent links for a subsequent browser view on the basis of the result of the further proactive inquiries so that the name of each intelligent link is suitable for displaying by the micro browser and provides generic information on the status or seriousness of inquiry results that can be expected if the respective intelligent link is activated by a user.

12. The system of claim 11, wherein the network server is configured to carry out the proactive inquiries to two or more different databases.

13. The system of claim 11, wherein the network server is further configured to select said inquiry application from among two or more inquiry applications allowed for the user, and each of the two or more inquiry applications having different sets of proactive inquiries.

14. A network server, for database inquiry services, the server comprising:

establishing means for establishing a connection with a micro browser;

receiving means for receiving an initial inquiry data input from the micro browser by a user;

searching means for carrying out proactive inquiries to one or more databases in order to find predefined information on the basis of the initial inquiry data;

name creating means for dynamically creating names of intelligent links for a next browser view on the basis of the results of the proactive inquiries in such a manner that the name of each intelligent link is suitable for displaying by the micro browser and provides generic information on the status or seriousness of inquiry results that can be expected if the respective intelligent link is activated by the user;

processing means for further processing proactive inquiries to one or more databases in order to find predefined information in response to the user activating one of the intelligent links in the next browser view;

creating means for creating names of intelligent links for the subsequent browser view on the basis of the results of said further proactive inquiries so that the name of each intelligent link is suitable for displaying by the micro browser and provides generic information on the status or seriousness of inquiry results that can be expected if the respective intelligent link is activated by the user;

processing means for further processing proactive inquiries to one or more databases in order to find predefined information in response to the user activating one of the intelligent links in the next browser view; and creating means for creating names of intelligent links for the subsequent browser view on the basis of the results of said further proactive inquiries so that the name of each intelligent link is suitable for displaying by the micro browser and provides generic information on the status or seriousness of inquiry results that can be expected if the respective intelligent link is activated by the user.

15. The server according to claim 14, the server further comprising additional processing means for processing proactive inquiries to two or more different databases.

16. The server according to claim 14, wherein the processing proactive inquiries being implemented by two or more inquiry applications selectable by the user, each of the two or more inquiry applications having different sets of proactive inquiries.

* * * * *